United States Patent
Wiese et al.

(10) Patent No.: US 7,900,049 B2
(45) Date of Patent: Mar. 1, 2011

(54) METHOD FOR RECOGNIZING AUDIO-VISUAL DATA IN TRANSMISSION NETWORKS, IN PARTICULAR INTERNET

(75) Inventors: Detlef Wiese, Freising (DE); Georg Plenge, Thanning (DE); Joerg Rimkus, Flensbug (DE)

(73) Assignee: Mayah Communications GmbH, Hallbergmoos (DE)

( * ) Notice: Subject to any disclaimer, the term of this patent is extended or adjusted under 35 U.S.C. 154(b) by 646 days.

(21) Appl. No.: 10/469,184

(22) PCT Filed: Feb. 27, 2002

(86) PCT No.: PCT/EP02/02086
§ 371 (c)(1),
(2), (4) Date: Mar. 22, 2004

(87) PCT Pub. No.: WO02/069595
PCT Pub. Date: Sep. 6, 2002

(65) Prior Publication Data
US 2004/0141495 A1    Jul. 22, 2004

(30) Foreign Application Priority Data
Feb. 27, 2001  (DE) .................... 101 09 441

(51) Int. Cl.
G06F 7/04     (2006.01)
G06F 17/30    (2006.01)
H04N 7/16     (2006.01)
H04N 7/167    (2006.01)
H04L 29/06    (2006.01)
H04L 9/32     (2006.01)
B41K 3/38     (2006.01)

(52) U.S. Cl. .............. 713/176; 726/2; 726/27; 726/31; 726/32; 726/33; 713/154; 380/59; 380/201; 725/4; 725/25

(58) Field of Classification Search ................ None
See application file for complete search history.

(56) References Cited

U.S. PATENT DOCUMENTS

| | | | | |
|---|---|---|---|---|
| 4,525,840 A * | 6/1985 | Heinz et al. | ..... | 386/49 |
| 4,686,563 A * | 8/1987 | Fountain et al. | ..... | 386/51 |
| 5,282,194 A * | 1/1994 | Harley et al. | ..... | 370/252 |
| 5,706,511 A * | 1/1998 | Tomoda | ..... | 1/1 |
| 5,828,425 A * | 10/1998 | Kim | ..... | 375/240.26 |
| 5,956,391 A * | 9/1999 | Melen et al. | ..... | 379/114.01 |
| 6,122,665 A * | 9/2000 | Bar et al. | ..... | 709/224 |
| 6,202,056 B1 * | 3/2001 | Nuttall | ..... | 705/52 |
| 6,216,228 B1 * | 4/2001 | Chapman et al. | ..... | 713/176 |
| 6,226,618 B1 * | 5/2001 | Downs et al. | ..... | 705/1.1 |
| 6,314,409 B2 * | 11/2001 | Schneck et al. | ..... | 705/54 |

(Continued)

FOREIGN PATENT DOCUMENTS
WO   WO 9948296 A1 *   9/1999

*Primary Examiner* — Nasser Moazzami
*Assistant Examiner* — Oscar A Louie
(74) *Attorney, Agent, or Firm* — Levine & Mandelbaum

(57) ABSTRACT

A method of recognizing an audio and/or visual format in a digital transmission network such as the Internet wherein formats include a quasi-continuous or divided in packets sequence of data, at least part of the sequence of data is analyzed for the presence of one or more bit patterns, and a notice is given in response to recognition of a predetermined format in an analyzed bit pattern.

38 Claims, 2 Drawing Sheets

U.S. PATENT DOCUMENTS

| | | | |
|---|---|---|---|
| 6,389,538 B1 * | 5/2002 | Gruse et al. | 713/194 |
| 6,477,648 B1 * | 11/2002 | Schell et al. | 726/22 |
| 6,668,246 B1 * | 12/2003 | Yeung et al. | 705/57 |
| 6,697,944 B1 * | 2/2004 | Jones et al. | 713/168 |
| 6,879,963 B1 * | 4/2005 | Rosenberg | 705/26 |
| 6,920,567 B1 * | 7/2005 | Doherty et al. | 726/22 |
| 6,959,288 B1 * | 10/2005 | Medina et al. | 705/51 |
| 7,035,335 B1 * | 4/2006 | Iacobelli et al. | 375/240.25 |
| 7,089,579 B1 * | 8/2006 | Mao et al. | 725/109 |
| 7,100,050 B1 * | 8/2006 | Coppersmith et al. | 713/176 |
| 2003/0023708 A1 * | 1/2003 | Jung | 709/221 |
| 2003/0061338 A1 * | 3/2003 | Stelliga | 709/224 |

* cited by examiner

METHOD FOR RECOGNIZING AUDIO-VISUAL DATA IN TRANSMISSION NETWORKS, IN PARTICULAR INTERNET

BACKGROUND OF THE INVENTION

The invention regards a method for recognizing audio-visual data in transmission networks, in particular Internet. For watching over the net it is not necessary to verify the contents of determined data, but only their format. In Internet today there are presented, transmitted and/or downloaded data files. Data are also proposed as so called Live-Streams, i.e. transmitted in a quasi-continuous way—with live or on demand audio-visual contents. Various determined formats are used from Microsoft, Real Networks, MPEG and others. Due to the better access for the Internet surfers and to the very great offer of music, the presence of musical data files in the mp3 format (MPEG 1, 2 and 2.5 Layer 3) in particular has increased in an exponential way. This method is known from the international standards ISO/IEC 11172-3 and 11318-3. The copyrights of the authors and the publishers, as well as other possible rights, of the said music files, are usually not taken in consideration by the Internet surfers during the downloads and very often by the exhibitors too. We can expect other coding methods to be used in different networks, like e.g. MPEG 4 AAC or MPEG 4 Twin VQ/AAC, mp3pro, AACPlus or MPEG 4 Video and also proprietor not standardized methods of Companies which have gained a place on the market, the so called Industry Standards.

Usually mp3-files are available on web-servers and can be reached by browsers like e.g. Netscape Navigator, Microsoft Internet Explorer, or others, using an URL (Unified Resource Location). If the Internet surfer could store an Audio or Video file on his or her own computer, he or she can reach it usually by clicking, i.e. controlling the web contents by means of the mouse, on the corresponding name, which indicates a piece of music, a film, a Radio or TV program. The file is transferred from the Internet to the user through a TCP/IP or FTP/IP or UDP/IP protocol, or possibly with RTP or RTSP. Due to the separation of the application from the IP protocol, it is not possible to know the format used in the transmission. This is valid for the last router of the Internet surfer too.

There is no control possibility for analyzing not allowable audio-visual files or formats and stopping the Internet access or transmission. Consequently the proprietors of rights e.g. for texts, music, movies, productions, lose all or part of their incomes. Padlocks are provided, which should prevent that, with the effect that corresponding unlocking algorithms are developed and the payment for the audio-visual productions are again circumvented.

SUMMARY OF THE INVENTION

It is an aim of the invention of avoiding the above said disadvantages.

This aim is reached by means of a method having the characteristics according to claim 1, while advantageous implementations are described in the subclaims.

DESCRIPTION OF THE PREFERRED EMBODIMENT

Figure 1:
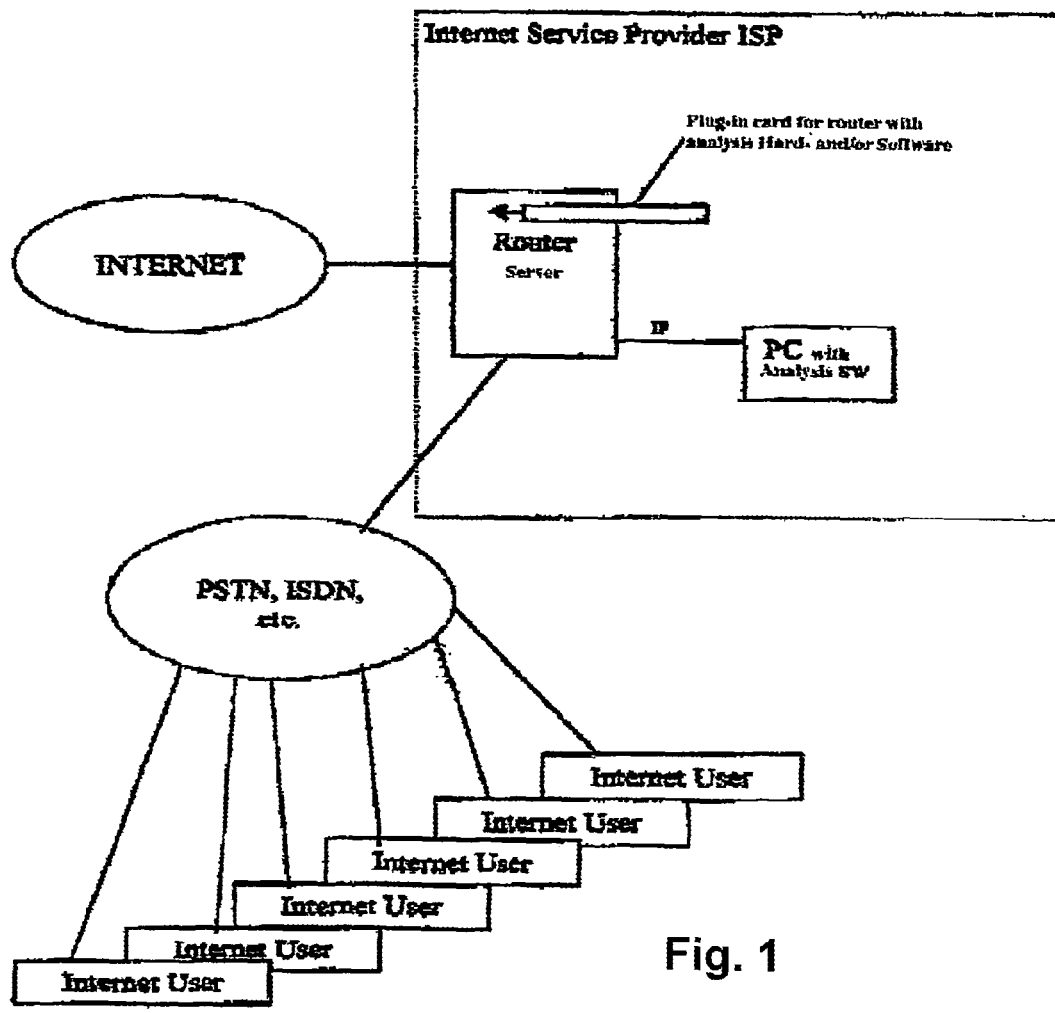
FIG. 1 is a schematic diagram illustrating the method of the preferred embodiment of the invention.

The invention will now be described in more detail by means of implementation examples.

Here are the characteristics of a first implementation example are shown in Table 1:

| $4^{th}$ Nr. 3 | | | | $8^{th}$ Nr. 3 | | | | | | | | $4^{th}$ Nr. 4 | | | | $4^{th}$ Nr. 4 | | | | | | | |
|---|---|---|---|---|---|---|---|---|---|---|---|---|---|---|---|---|---|---|---|---|---|---|---|
| 1 | 1 | 1 | 0 | 0 | 1 | 0 | 1 | 1 | 1 | 1 | 1 | 1 | 1 | 1 | 0 | 0 | 1 | 0 | 1 | 0 | 0 | 1 | 1 |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| $4^{th}$ Nr. 3 | | | | $8^{th}$ Nr. 3 | | | | | | | | $4^{th}$ Nr. 4 | | | | $4^{th}$ Nr. 4 | | | | | | | |
| 1 | 0 | 1 | 0 | 0 | 1 | 0 | 1 | 0 | 1 | 0 | 1 | 1 | 1 | 1 | 1 | 1 | 1 | 0 | 1 | 0 | 0 | 1 | 1 |
| 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |

TABLE 1

| | |
|---|---|
| Used data: | Datasequence, consisting of |
| Pre-knowledge: | Subsequent frames with 4 or 8 bits |
| | 11 at the beginning of a $4^{th}$ frame means "Audio" |
| | 0101 at the beginning of a $8^{th}$ frame means "Video" |
| Number of necessary indications: | 3 out of 4 |

By means of a searching algorithm, preset for recognizing the bit patterns "11" and "0101", the beginnings of a 4th and 8th frame are searched for. The knowledge of the distances between two "11" of a 4th block and two "0101" of a 8th block are used as a check for avoiding a mistaken interpretation of the found data pattern.

Data signals can be transmitted with or without error protection. In the last case, another parameter, namely the number of the checks, can be used for deciding whether or not the identification is correct. Furthermore it has to be considered that at least 3 out of 4 frames must show the corresponding data pattern.

Correct Interpretation

Bits 1 and 2, as well as 13 and 14, as well as 37 and 38 are identified as "11" data pattern. Because only a position, i.e. 25 and 26 do not show "11" but "10", this fact will be considered a transmission error by the algorithm.

False Interpretation

Bits 2 and 3, as well as 14 and 15 are identified as "11" data pattern. Later, during the check of bits 26 and 27 as well as 42 and 43, which show one time "01" and one time "10", the algorithm concludes that they are not the correct beginnings.

The special characteristics of the second implementation example are:
Transmission Medium: Internet
Used data: MPEG 1/2 Layer 3, also called mp3, coded with 128 Kbit/s
Transmission protocol TCP/IP
Sender name (-address) XAV (123.456.789.12)
Receiver name (-address) MAK (987.654.321.98)

The construction of a mp3 data stream, the so called Audio Frame, appears, according to ISO/IEC 11172-3 and 11318-3, in the way shown in Table 2:

TABLE 2

| MP3 Audio Frame | | | |
|---|---|---|---|
| Header | Error Check | Audio Data | Ancillary Data |

The composition of the four segments of data, or fields, like Header, Error Check, Audio Data and Ancillary Data is as follows:

Header, consisting of Syncword, ID, layer, protection_bit, bitrate_index, sampling_frequency, padding_bit, mode, mode_extension, copyright, original/copy, emphasis
Error check, consisting of Crc_check
Audio data, consisting of Bit_allocation, scalefactors, samples
Ancillary data, consisting of Free Data, to be defined by the user.

In this implementation example, in particular the first variables of the header are used for the analysis, like the fields Syncword, which has always for definition the contents '1111 1111 1111',
ID, which in the MPEG use, as in the example has the contents '1' and
Layer, which in Layer 3 use, as in the example has the contents '01' and
Bitrate_index, according to the following table, which indicates the used Bitrate and also the length of the frame.

TABLE 3

| Bit rate Index | Corresponding Bitrate in Kbit/s | Corresponding Length in Byte |
|---|---|---|
| 0000 | Frei | Frei |
| 0001 | 32 | 96 |
| 0010 | 40 | 120 |
| 0011 | 48 | 144 |
| 0100 | 56 | 168 |
| 0101 | 64 | 192 |
| 0110 | 80 | 240 |
| 0111 | 96 | 288 |
| 1000 | 112 | 334 |
| 1001 | 128 | 384 |
| 1010 | 160 | 478 |

TABLE 3-continued

| Bit rate Index | Corresponding Bitrate in Kbit/s | Corresponding Length in Byte |
|---|---|---|
| 1011 | 192 | 576 |
| 1100 | 224 | 668 |
| 1101 | 256 | 768 |
| 1110 | 320 | 956 |
| 1111 | Not Allowed | Not Allowed |

"1111" is not allowed due to the collision with the Syncword identification which has the contents '1111 1111 1111'.

Furthermore other variables, like for instance Bit_allocation or Scalefactors, can be used for the analysis.

With a 128 Kbit/s mp3 encoding and a frame duration of 24 ms, the mp3 Audio Frame has an average length of 128000 Bit/s*0.024 s=3072 bits=384 Bytes.

The Internet transmission protocols are directed to the OSI-reference pattern represented in Table 4. The application Data—here mp3—are located in the Layer 1 layer. This cannot be exchanged with Layer 1 of the ISO/IEC MPEG Standard.

TABLE 4

| Corresponding protocols inside the OSI reference pattern | | | |
|---|---|---|---|
| Layer 7 | RTSP | HTTP | |
| Layer 6 | RTP/RTCP | Cyclic UDP | |
| Layer 5 | RTSP | HTTP | |
| Layer 4 | TCP | UDP | PSVP |
| Layer 3 | IP | | |
| Layer 2 | Security Layer | | |
| Layer 1 | Bit Transmission Layer | | |

The known protocols used for Internet are located in Layer 4 and Layer 3, here also TCP and IP. A typical size of the in Internet transmitted packets is 1.5 Kbyte, which means that the 384 Byte size of the Audio Frame used in the example, can be contained many times inside a TCP/IP packet.

The marking variables contained in an Audio Frame, like Syncword, ID and layer can appear many times in each TCP packet.

The TCP packets transmitted in Internet are identified by a Header too, which by the way shows the so called port numbers, which identify the transmitting and receiving applications, and a sequence number, which gives the position of each segment in the Data stream.

Figure 2:
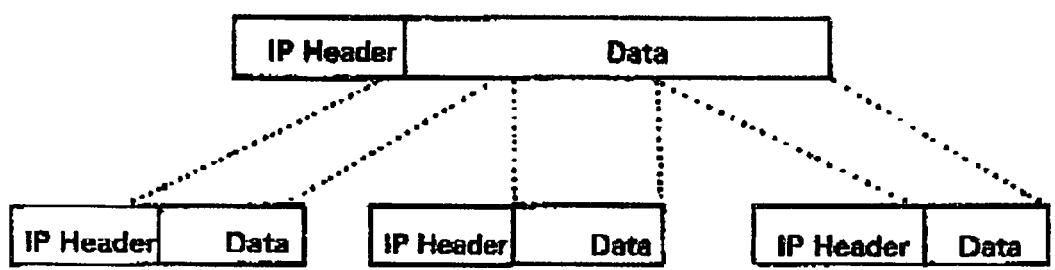
FIG. 2 is a schematic diagram showing fragmentation of IP packets in accordance with the preferred embodiment of the invention.

The IP packets transmitted in Internet, here TCP/IP, can, if necessary, also be fragmented, for instance made smaller, see FIG. 2.

With the fragmentation we can obtain TCP/IP packets so small that a mp3 Audio Frame cannot more completely fit inside the TCP/IP packet, and therefore there is also the probability that even variables like syncword, ID and layer cannot fit in one packet.

At last, many different packets pertaining to several applications can be found at the selection server for an Internet surfer, for instance as represented in Table 5:

TABLE 5

| TCP 4 for Application 3 | TCP 5 for Application 3 | TCP 21 for Application 2 | TCP 6 for Application 5 | TCP 20 for Application 2 | TCP 15 for Application 2 | TCP 22 for Application 2 | TCP 3 for Application 3 |
|---|---|---|---|---|---|---|---|

The corresponding contents are unknown to the router, which is at the selection server. He is only sure that the Internet surfer connected to him receives his addressed IP packets, independently from the relevant source, application size, etc. The router also does not arrange the packets according the correct sequence—this task is performed by the receiving application of the Internet surfer.

The method according to the invention analyzes the IP packets, as regards their bit contents, before delivering the file to the Internet surfer, documenting sender and receiver, performing a verification of the legality, and blocking the delivery, if this is necessary.

The mp3 files or mp3-live-streams are characterized in that, in Layer 1, the bit transmission layer, the sequence of bits, consisting of sync word, IP and layer, leads to the pattern represented in Table 6:

TABLE 6

Fixed bit pattern at the beginning of the frame when MP3 is used

| | | | | | | | | | | | | ID | Layer |
|---|---|---|---|---|---|---|---|---|---|---|---|---|---|
| 1 | 1 | 1 | 1 | 1 | 1 | 1 | 1 | 1 | 1 | 1 | 1 | 1 0 | 1 |

The MP3 Data stream is divided in packets and provided with an IP-protocol, e.g. TCP, UDP, or FTP. The packets have usually a size of 1500 bytes, i.e. 12000 bits. With the said frame size, we can assume that in an IP-packet, at least one header is contained.

The method according to the invention stores one or more packets, according to the memory size, into the memory. The protocol used for the transmission analyzes and determines the addresses of the sender and the addressee, and memorizes them separately. The data pertaining to the application are then insulated from the bit transmission layer (Layer 1) and, if this is necessary, ordered according to the correct sequence. The bit pattern shown in Table 6 is then searched for in said insulated sequence of data for the application. If the analysis is positive, then the analysis is repeated a few times in order to assure that the format is indeed the searched one.

For verifying the legality of the transmission, several criteria can be applied. From the one side there can be available one more or less regular comparison table, in order to compare the address of legal senders of audio-visual contents with the sender address of the actual IP-packet. If the address is that of a legal sender, then it is not necessary to perform a further control of the packets. Further possibilities consist in the additional provision of utilizing in the analysis method according to the invention, locking mechanisms, like watermarking, etc., available in the application, with the knowledge of the use.

In order to do a precise declaration about the quantity of the data called by the Internet surfer, the analysis is performed in a quasi-continuous way for each IP packet. The results of the analysis is kept in a table, which may e.g. have the following aspect shown in Table 7.

TABLE 7

View of a possible table with the analysis results

| Sender | Receiver | | Volume Kbytes | Bitrate (Kbits/s) | Time (s) |
|---|---|---|---|---|---|
| | | MP-3 Packets | | | |
| XAV (123.456.789.12) | MAK 987.654.321.98 | 12345 | 1.5 | 128 | 0.1 |
| | | 12346 | 1.5 | 128 | 0.1 |
| | | 12347 | 3 | 128 | 0.2 |
| | | 12348 | 1.5 | 128 | 0.1 |
| | | 12349 | 1.5 | 128 | 0.1 |
| | | 12350 | 1.5 | 128 | 0.1 |
| | | 12351 | 3 | 128 | 0.2 |
| | | 12352 | 3 | 128 | 0.2 |
| | | 12353 | 3 | 128 | 0.2 |
| | | 12354 | 1.5 | 128 | 0.1 |
| | | 12355 | 0.384 | 128 | 0.02 |
| | | Packets Nr. | | | |
| | | 11 | 21.384 | 128 | 1.42 |

In the case that the following data of the application data have to be analyzed, e.g. in the in mp3 often used ID-tab, then also they have to be optionally kept: the contents of the mp3 files, the composer, the executor, etc. Such data can be prepared for and used by the relevant Organizations (in Germany the GEMA).

In the case of a mobile Internet surfer (e.g. with GMS, UMTS, GPRS), it is necessary to guarantee that the analysis has been made at the relevant server, which may change during the movement from one to another transmission cell of the network, if the server is note always the same. To this purpose, the method according to the invention may advantageously be used, wherein at each server which is activated, a piece of information is prepared, which indicates the actually analyzed receiving address.

For optimizing the calculation capacity for the method according to the invention, the following variant may be used: in the case that the positive analysis has to be performed very often, i.e. in each IP-packet of the application, then it is possible to a) perform the analysis only for each nth packet, or
b) evaluate only once the distance between two syncwords (1111 1111 1111) from the bitrate and verify the syncword only at said distances.

The variant b) can be used also for a better identification, as a causal connection exists between the bitrate in the bitrate index, the length of the transmitted frame, and the distance between two syncwords "111111111111". In the example (bitrate_index-"1001", corresponds to 128 kBit/s) we clearly obtain a distance between two syncwords "111111111111" of 384 Bytes=3072 bits.

FIG. 1 shows the construction for realizing the method according to the invention. Internet users of very different types can for instance connect to an Internet Service Provider, like t-online or AOL, through PSTN (Public Switched Telephone Network) (modem) or ISDN, in order to surf in Internet, calling information or sending e-mails. The flow of information between the different Internet attendants, hence also the Service providers and the Internet users, between one Internet site and another as well as between Internet sites and Internet users, is developed through a so called server, a router. The method according to the invention comes therefore in the form of a
 a) plug-in card for the router, or
 b) an add-on software running on a PC, which analyzes the inserted data.

During the analysis the data are not decoded, hence e.g. made audible, if they are music data, but the format of the data is analyzed by comparison with a determined pattern, in order to verify a determined format.

As explained, for the bit pattern analysis a decoding of the data stream is not foreseen, but bit pattern or bit streams are examined quasi "from outside", and, if a corresponding bit pattern is analyzed, it is possible to infer also the format, or the coding, without having to decode or actually hear e.g. the music contents of the data stream.

The invention claimed is:

1. Method for preventing the receipt by an unauthorized receiver of digital audio/video data transmitted over a digital transmission network, comprising
 storing and analyzing in a server, arranged upstream from a receiver, all or part of said data directed to said receiver for detecting a predetermined bit pattern of an audio/video format, wherein said bit pattern comprises a synchronizing word of an audio/video format and said analyzing comprises verifying the distance between sync-words from the frame lengths of a sequence of data, according to said audio/video format,
 if said predetermined bit pattern is determined to be present, performing, wholly within the server, a verification of the legality of the transmission of said data, and
 delivering said data to the receiver over the digital transmission network or blocking the delivery of the data to the receiver over the digital transmission network as a function of said verification.

2. Method according to claim 1, further comprising storing in a memory the address of a sender of said data and the sequence of said data in response to said data having said predetermined format.

3. Method according to claim 2 wherein said memorized sender address is stored in a first list of senders of said data, and further comprising comparing said first list with a second list in which there are stored the addresses of allowed senders of said data.

4. Method according to claim 3 wherein the transmission of data is interrupted in response to the absence of the address of the sender from the list of the addresses of allowed senders of said data.

5. Method according to claim 1 wherein the address of a receiver of the data and the duration of the transmission are stored in a memory.

6. Method according to claim 1 wherein the data is in a format selected from the group consisting of MP3, mp3 pro, AAC, AAC Plus, MPEG 1 or 2, Layer 2 or Layer 3 or MPEG 2.5 Layer 3, where MPEG stands for Moving Picture Experts Group, mp3 stands for MPEG-1 Audio Layer 3, and AAC stands for Advanced Audio Coding.

7. Method according to claim 1 further comprising storing in a memory the content of said data and the identity of a proprietor, composer, author, or writer of said content.

8. Method according to claim 1 comprising storing in a memory a table containing all of said data.

9. Method according to claim 1 further comprising locking at least part of said data before analyzing said data, and unlocking said data in response to the absence of said bit pattern from said data.

10. Method according to claim 1 wherein said analyzing takes place at an Internet server.

11. Method according to claim 10, wherein said analyzing is done by a personal computer.

12. Method according to claim 1 further comprising providing a router connected to said network with a plug-in card which prevents said data from being received by said receiver from said router in response to said bit pattern indicating that the digital data is prohibited to the receiver.

13. Method according to claim 1 wherein at a router of different Internet servers prepared lists are continuously compared one to the other and/or updated or exchanged.

14. Method according to claim 1 wherein said analyzing is done without decoding said data.

15. Method according to claim 1, wherein said analyzing is done on a header for said data.

16. Method according to claim 1 wherein said data is insulated from a bit transmission layer.

17. A method according to claim 1 wherein a synchronizing word in said data is analyzed for the presence of a bit pattern indicative of whether the content information in the digital data is prohibited to the receiver.

18. Method according to claim 1, wherein the server orders said data directed to said receiver according to a correct sequence.

19. Method for preventing the receipt by an unauthorized receiver of digital audio/video data transmitted over a digital transmission network, comprising
 storing and analyzing in a server, arranged upstream from a receiver, all or part of said data directed to said receiver for detecting a predetermined bit pattern of an audio/video format, wherein a synchronizing word in said data is analyzed for the presence of a bit pattern indicative of whether the content information in the digital data is prohibited to the receiver,
 if said predetermined bit pattern is determined to be present, performing, wholly within the server, a verification of the legality of the transmission of said data, and
 delivering said data to the receiver over the digital transmission network or blocking the delivery of the data to the receiver over the digital transmission network as a function of said verification.

20. Method according to claim 19, wherein said bit pattern comprises a synchronizing word of an audio/video format.

21. Method according to claim 20 wherein said analyzing further comprises verifying the distance between sync-words from the frame lengths of a sequence of data, according to said audio/video format.

22. Method according to claim 19, further comprising storing in a memory the address of a sender of said data and the sequence of said data in response to said data having said predetermined format.

23. Method according to claim 22 wherein said memorized sender address is stored in a first list of senders of said data, and further comprising comparing said first list with a second list in which there are stored the addresses of allowed senders of said data.

24. Method according to claim 23 wherein the transmission of data is interrupted in response to the absence of the address of the sender from the list of the addresses of allowed senders of said data.

25. Method according to claim 19 wherein the address of a receiver of the data and the duration of the transmission are stored in a memory.

26. Method according to claim 19 wherein the data is in a format selected from the group consisting of MP3, mp3 pro, AAC, AAC Plus, MPEG 1 or 2, Layer 2 or Layer 3 or MPEG 2.5 Layer 3, where MPEG stands for Moving Picture Experts Group, mp3 stands for MPEG-1 Audio Layer 3, and AAC stands for Advanced Audio Coding.

27. Method according to claim 19 further comprising storing in a memory the content of said data and the identity of a proprietor, composer, author, or writer of said content.

28. Method according to claim 19 comprising storing in a memory a table containing all of said data.

29. Method according to claim 19 further comprising locking at least part of said data before analyzing said data, and unlocking said data in response to the absence of said bit pattern from said data.

30. Method according to claim 19 wherein said analyzing takes place at an Internet server.

31. Method according to claim 30, wherein said analyzing is done by a personal computer.

32. Method according to claim 19 further comprising providing a router connected to said network with a plug-in card which prevents said data from being received by said receiver from said router in response to said bit pattern indicating that the digital data is prohibited to the receiver.

33. Method according to claim 19 wherein at a router of different Internet servers prepared lists are continuously compared one to the other and/or updated or exchanged.

34. Method according to claim 19 wherein said analyzing is done without decoding said data.

35. Method according to claim 19, wherein said analyzing is done on a header for said data.

36. Method according to claim 19 wherein said data is insulated from a bit transmission layer.

37. Method according to claim 19, wherein the server orders said data directed to said receiver according to a correct sequence.

38. Method for preventing the receipt by an unauthorized receiver of digital audio/video data transmitted over a digital transmission network, comprising storing and analyzing in a server, arranged upstream from a receiver, all or part of said data directed to said receiver for detecting a predetermined bit pattern of an audio/video format, if said predetermined bit pattern is determined to be present, performing, wholly within the server, a verification of the legality of the transmission of said data, and delivering said data to the receiver over the digital transmission network or blocking the delivery of the data to the receiver over the digital transmission network as a function of said verification, wherein at a router of different Internet servers prepared lists are continuously compared one to the other and/or updated or exchanged.

\* \* \* \* \*